US009603139B2

United States Patent
Lee et al.

(10) Patent No.: US 9,603,139 B2
(45) Date of Patent: Mar. 21, 2017

(54) METHOD AND DEVICE FOR TRANSMITTING AND RECEIVING DOWNLINK SIGNAL IN WIRELESS COMMUNICATION SYSTEM

(71) Applicant: LG ELECTRONICS INC., Seoul (KR)

(72) Inventors: Seungmin Lee, Anyang-si (KR); Jonghyun Park, Anyang-si (KR); Inkwon Seo, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/426,103

(22) PCT Filed: Sep. 23, 2013

(86) PCT No.: PCT/KR2013/008483
§ 371 (c)(1),
(2) Date: Mar. 4, 2015

(87) PCT Pub. No.: WO2014/046502
PCT Pub. Date: Mar. 27, 2014

(65) Prior Publication Data
US 2015/0257130 A1    Sep. 10, 2015

Related U.S. Application Data

(60) Provisional application No. 61/703,784, filed on Sep. 21, 2012, provisional application No. 61/740,447, (Continued)

(51) Int. Cl.
*H04W 72/04* (2009.01)
*H04L 5/14* (2006.01)
*H04L 5/00* (2006.01)

(52) U.S. Cl.
CPC ......... *H04W 72/042* (2013.01); *H04L 5/0092* (2013.01); *H04L 5/1469* (2013.01);
(Continued)

(58) Field of Classification Search
CPC ............ H04W 72/042; H04W 72/0446; H04L 5/0092; H04L 5/1469; H04L 5/0023; H04L 5/0035
(Continued)

(56) References Cited

U.S. PATENT DOCUMENTS 8,902,842 B1 *  12/2014  Gomadam et al. .......... 370/329
2007/0218897 A1 *  9/2007  Yukizaki et al. .......... 455/432.1
(Continued)

FOREIGN PATENT DOCUMENTS

KR   10-2009-0094743 A   9/2009
KR   10-2010-0023921 A   3/2010
(Continued)

*Primary Examiner* — Asad Nawaz
*Assistant Examiner* — Thomas R Cairns
(74) *Attorney, Agent, or Firm* — Birch, Stewart, Kolasch & Birch, LLP

(57) ABSTRACT

The present invention relates to a method and device for receiving a downlink signal by a terminal in a wireless communication system. More particularly, the method includes: receiving first quasi co-location (QCL) characteristic-related information for the downlink communication of a first RF resource; and receiving a downlink signal by using a second RF resource, wherein the second RF resource indicates an RF resource when the use of an RF resource is changed from uplink communication use to downlink communication use at a specific time, and a downlink signal is decoded by using second QCL characteristic-related information for the downlink communication of the second RF (Continued)

resource, and the first QCL characteristic-related information and the second QCL characteristic-related information are independently defined.

18 Claims, 12 Drawing Sheets

Related U.S. Application Data filed on Dec. 20, 2012, provisional application No. 61/820,675, filed on May 7, 2013.

(52) U.S. Cl.
CPC .......... *H04L 5/0023* (2013.01); *H04L 5/0035* (2013.01); *H04W 72/0446* (2013.01)

(58) Field of Classification Search
USPC .......................................... 370/336
See application file for complete search history.

(56) References Cited

U.S. PATENT DOCUMENTS

| | | |
|---|---|---|
| 2008/0298494 A1 | 12/2008 | Richardson et al. |
| 2010/0085956 A1 | 4/2010 | Ahn et al. |
| 2011/0243059 A1 | 10/2011 | Liu et al. |
| 2013/0051356 A1 | 2/2013 | Hong et al. |
| 2013/0208685 A1 | 8/2013 | Zhang et al. |
| 2013/0279437 A1* | 10/2013 | Ng et al. ........................ 370/329 |
| 2013/0294369 A1* | 11/2013 | Dinan ..................... H04L 5/001 370/329 |
| 2014/0198763 A1* | 7/2014 | Sorrentino et al. ........... 370/330 |
| 2015/0103703 A1* | 4/2015 | Zeng ..................... H04W 72/14 370/280 |

FOREIGN PATENT DOCUMENTS

| | | |
|---|---|---|
| KR | 10-2011-0122046 A | 11/2011 |
| WO | WO 2011/126247 A2 | 10/2011 |
| WO | WO 2012/037716 A1 | 3/2012 |

* cited by examiner

FIG. 2
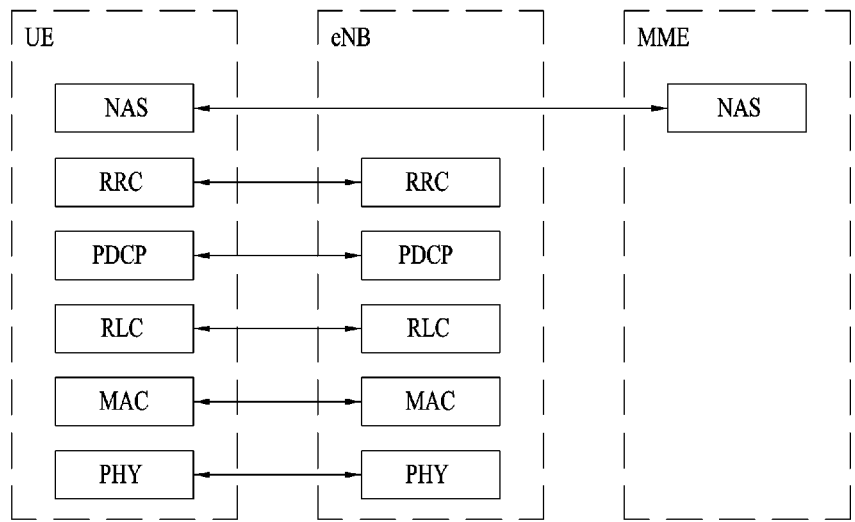
(a) CONTROL-PLANE PROTOCOL STACK
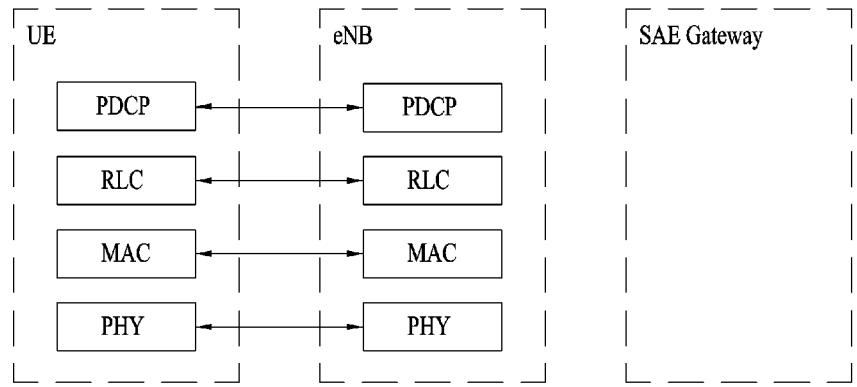
(b) USER-PLANE PROTOCOL STACK

METHOD AND DEVICE FOR TRANSMITTING AND RECEIVING DOWNLINK SIGNAL IN WIRELESS COMMUNICATION SYSTEM

CROSS REFERENCE TO RELATED APPLICATIONS

This application is the National Phase of PCT International Application No. PCT/KR2013/008483, filed on Sep. 23, 2013, which claims priority under 35 U.S.C. 119(e) to U.S. Provisional Application No. 61/703,784 filed on Sep. 21, 2012, 61/740,447 filed on Dec. 20, 2012 and 61/820,675 filed on May 7, 2013, all of which are hereby expressly incorporated by reference into the present application.

TECHNICAL FIELD

The present invention relates to a wireless communication system, and more particularly, to a method and device for transmitting and receiving downlink signal by a user equipment (UE) in a wireless communication system.

BACKGROUND ART

As an example of a mobile communication system to which the present invention is applicable, a 3rd generation partnership project long term evolution (3GPP LTE) (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in the 3GPP. E-UMTS may be referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink (DL) or uplink (UL) transmission service to multiple UEs. Different cells may be configured to provide different bandwidths. The eNB controls data transmission and reception to and from a plurality of UEs. Regarding DL data, the eNB transmits DL scheduling information to notify a corresponding UE of a time/frequency domain within which data is to be transmitted, coding, data size, and hybrid automatic repeat and request (HARQ)-related information. In addition, regarding UL data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of the UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simplified structure, open interface, appropriate power consumption of a UE, etc. are required.

DISCLOSURE

Technical Problem

An object of the present invention devised to solve the problem lies in a method and device for transmitting and receiving downlink signal by a user equipment (UE) in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method for receiving a downlink signal by a user equipment (UE) in a wireless communication system, the method including receiving information associated with first quasi co-location (QCL) property for downlink communication of a first radio resource, and receiving the downlink signal using a second radio resource, wherein the second radio resource is a radio resource, use of which is changed to use of downlink communication from use of uplink communication at a specific time point, the downlink signal is decoded using information associated with second QCL property for downlink communication of the second radio resource, and the information associated with the first QCL property and the information associated with the second QCL property are independently defined.

The method may further include receiving the information associated with the second QCL property. Furthermore, QCL property of the second radio resource may be configured based on the information associated with the second QCL property and the information associated with the first QCL property.

Reception power for the second radio resource may be configured to be lower than reception power for the first radio resource.

At least one parameter may be commonly assumed between the information associated with the first and second QCL properties.

At least one parameter may be commonly assumed between the information associated with the first and second QCL properties when the information associated with the first and second QCL properties is configured to use oscillator for the first and second radio resources.

The information associated with the first and second QCL properties may be determined according to a radio resource at a time point in which downlink control information is received. Furthermore, a format of the downlink control information may be DCI format 2D.

A physical downlink shared channel (PDSCH) starting symbol for the first radio resource and a PDSCH starting symbol for the second radio resource may be independently defined.

Specific PQI state information may be configured to be differently applied to the first and second radio resources.

In another aspect of the present invention, provided herein is a user equipment (UE) for receiving a downlink signal in a wireless communication system, the UE including a radio frequency (RF), and a processor, wherein the processor is configured to receive information associated with first quasi co-location (QCL) property for downlink communication of a first radio resource and to receive the downlink signal using a second radio resource, the second radio resource is a radio resource, use of which is changed to use of downlink communication from use of uplink communication at a specific time point, the downlink signal is decoded using information associated with second QCL property for downlink communication of the second radio resource, and the information associated with the first QCL property and the information associated with the second QCL property are independently defined.

Advantageous Effects

The present invention, a downlink signal of a user equipment (UE) can be effectively transmitted and received in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram illustrating structures of a control plane and a user plane of a radio interface protocol between a UE and an E-UTRAN based on 3GPP radio access network specifications;

BEST MODE

Figure 1:
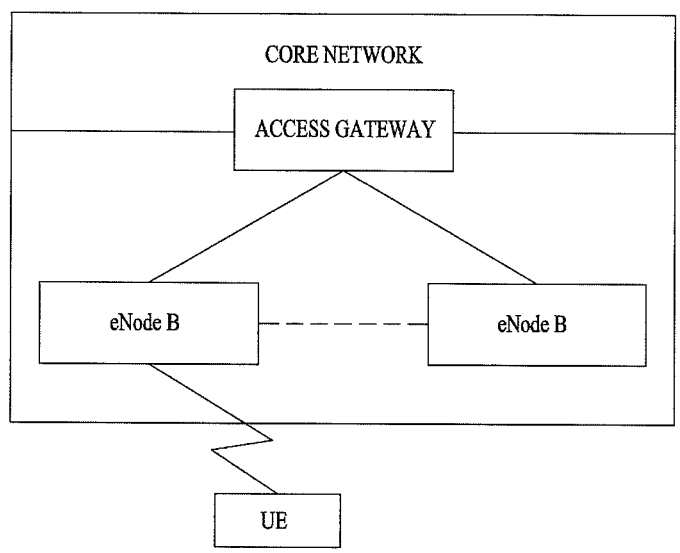
FIG. 1 is a diagram schematically illustrating a network structure of an E-UMTS as an exemplary radio communication system.

The following technology may be applied to a variety of wireless access systems using code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communications (GSM)/general packet radio service (GPRS)/enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802-20, and evolved UTRA (E-UTRA). UTRA is a part of a universal mobile telecommunications system (UMTS). 3GPP LTE is a part of evolved UMTS (E-UMTS) using E-UTRA. 3GPP LTE employs OFDMA in DL and SC-FDMA in UL. LTE-advanced (LTE-A) is an evolved version of 3GPP LTE.

For clarity of description, the following description focuses on the 3GPP LTE/LTE-A system. However, the technical features of the present invention are not limited thereto. Specific terms used in the following description are provided to aid in understanding the present invention. These specific terms may be replaced with other terms within the scope and spirit of the present invention.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer, which is a first layer, provides an information transfer service to an upper layer using a physical channel. The physical layer is connected to a media access control (MAC) layer of an upper layer via a transmission channel (an antenna port channel). Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an OFDMA scheme in DL and is modulated using an SC-FDMA scheme in UL.

The MAC layer, which is a second layer, provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting an eNB is configured to use one of bandwidths of 1.4, 3, 5, 10, and 20 MHz to provide a DL or UL transmission service to a plurality of UEs. Different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
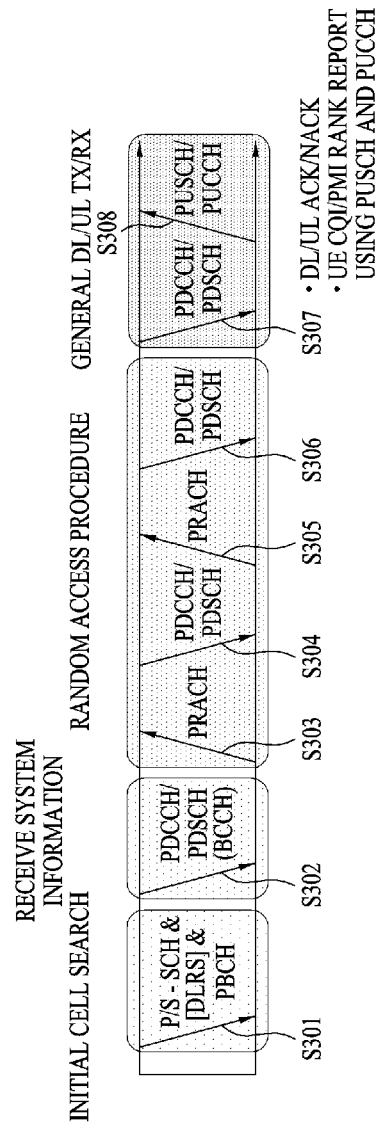
FIG. 3 is a diagram illustrating physical channels used in a 3GPP system and a general signal transmission method using the same.

FIG. 3 is a diagram illustrating physical channels used in a 3GPP system and a general signal transmission method using the same.

When a UE is powered on or enters a new cell, the UE performs initial cell search such as synchronization acquisition with an eNB in step S301. To this end, the UE may receive a primary synchronization channel (P-SCH) and a secondary synchronization channel (S-SCH) from the eNB, establish synchronization with the eNB, and acquire information such as a cell identity (ID). Thereafter, the UE may receive a physical broadcast channel (PBCH) from the eNB to acquire information broadcast in the cell. Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S302.

Next, the UE may perform a random access procedure such as steps S303 to S306 to complete access to the eNB. To this end, the UE may transmit a preamble through a physical random access channel (PRACH) (S303) and receive a response message to the preamble through the PDCCH and the PDSCH corresponding to the PDCCH (S304). In the case of contention-based random access, a contention resolution procedure including transmission of a PRACH signal (S305) and reception of a PDCCH signal and a PDSCH signal corresponding to the PDCCH signal (S306) may be additionally performed.

The UE which has performed the above procedures may receive a PDCCH and/or PDSCH signal (step S307) and transmit a physical uplink shared channel (PUSCH) and/or physical uplink control channel (PDCCH) signal (step S308) according to a general UL/DL signal transmission procedure. Control information that the UE transmits to the eNB is referred to as uplink control information (UCI). The UCI includes a hybrid automatic repeat and request (HARQ) acknowledgement (ACK)/negative ACK (NACK), a scheduling request (SR), channel state information (CSI), etc. In the present disclosure, HARQ ACK/NACK is shortened to HARQ-ACK or ACK/NACK (A/N). HARQ-ACK includes at least one of positive ACK (simply, ACK), negative ACK (simply, NACK), discontinuous transmission (DTX), and NACK/DTX. The CSI includes a channel quality indicator (CQI), a precoding matrix index (PMI), a rank indicator (RI), etc. While UCI is generally transmitted on a PUCCH, if control information and traffic data are to be transmitted simultaneously, the UCI may be transmitted on a PUSCH. The UCI may be transmitted aperiodically on the PUSCH upon request/command of a network.

Figure 4:
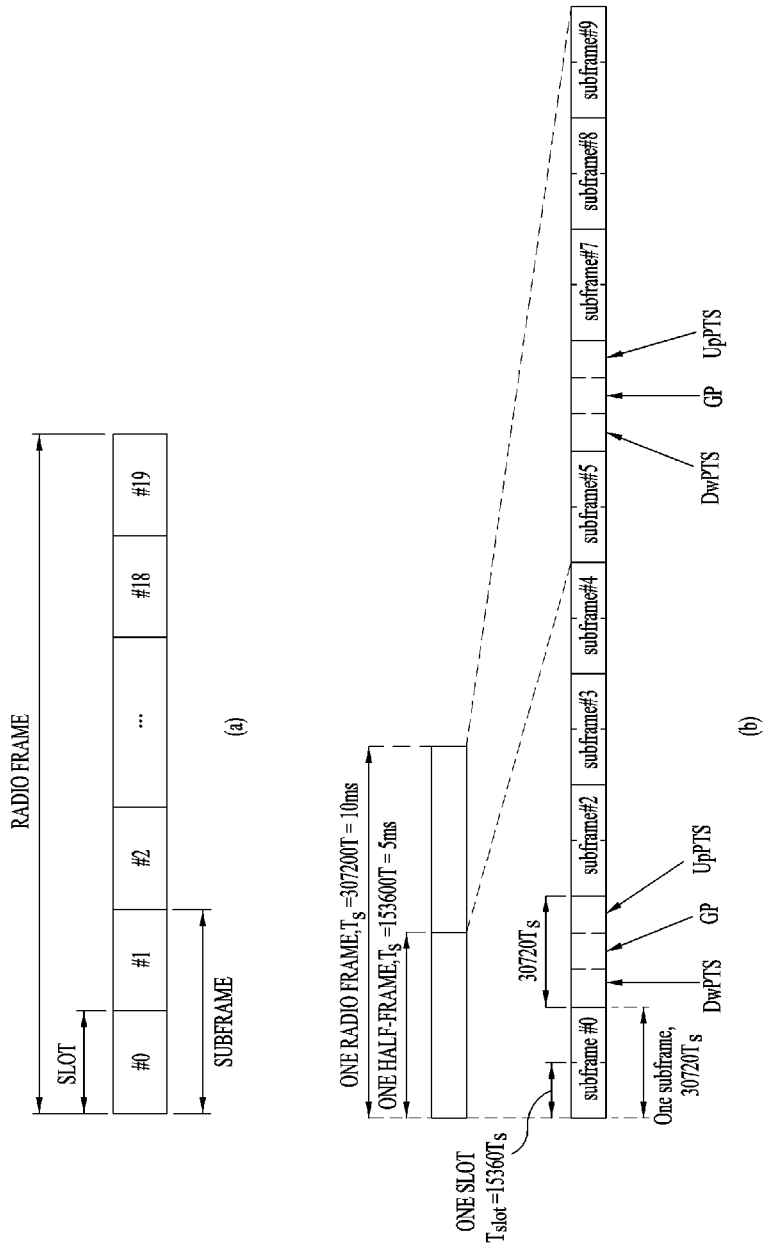
FIG. 4 is a diagram illustrating the structure of a radio frame used in an LTE system.

FIG. 4 is a diagram illustrating the structure of a radio frame used in an LTE system.

Referring to FIG. 4, in a cellular orthogonal frequency division multiplexing (OFDM) wireless packet communication system, UL/DL data packets are transmitted in subframes. One subframe is defined as a predetermined time interval including a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating the structure of the type 1 radio frame. A DL radio frame includes 10 subframes, each subframe including two slots in the time domain. A time required to transmit one subframe is defined as a Transmission Time Interval (TTI). For example, one subframe may be 1 ms long and one slot may be 0.5 ms long. One slot includes a plurality of OFDM symbols in the time domain and a plurality of resource blocks (RBs) in the frequency domain. Since 3GPP LTE uses OFDMA for DL, an OFDM symbol is one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a cyclic prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is unstable, as is the case when the UE rapidly moves, the extended CP may be used in order to further reduce inter-symbol interference.

In the case of the normal CP, since one slot includes 7 OFDM symbols, one subframe includes 14 OFDM symbols. Up to first three OFDM symbols of each subframe may be allocated to a PDCCH and the remaining OFDM symbols may be allocated to a PDSCH.

FIG. 4(b) illustrates the structure of the type 2 radio frame. The type 2 radio frame includes two half frames, each half frame including four general subframes each having two slots and one special subframe including a downlink pilot time slot (DwPTS), a guard period (GP), and an uplink pilot time slot (UpPTS).

In the special subframe, the DwPTS is used for initial cell search, synchronization, or channel estimation at a UE, and the UpPTS is used for channel estimation and UL transmission synchronization with a UE at an eNB. That is, the DwPTS is used for DL transmission and the UpPTS is used for UL transmission. Particularly, the UpPTS is used for transmission of a PRACH preamble or a sounding reference signal (SRS). The GP is used to cancel UL interference between UL and DL, caused by multi-path delay of a DL signal.

The current 3GPP standard specification defines the following configurations listed in Table 1 below for the special subframe. Table 1 illustrates DwPTSs and UpPTSs in the case where Ts=1/(15000×2048). The remaining region except for a DwPTS and an UpPTS is set as a GP.

Accordingly, the number of subframes in a radio frame, the number of slots in a subframe, and the number of symbols in a slot may be changed in various manners.

Figure 5:
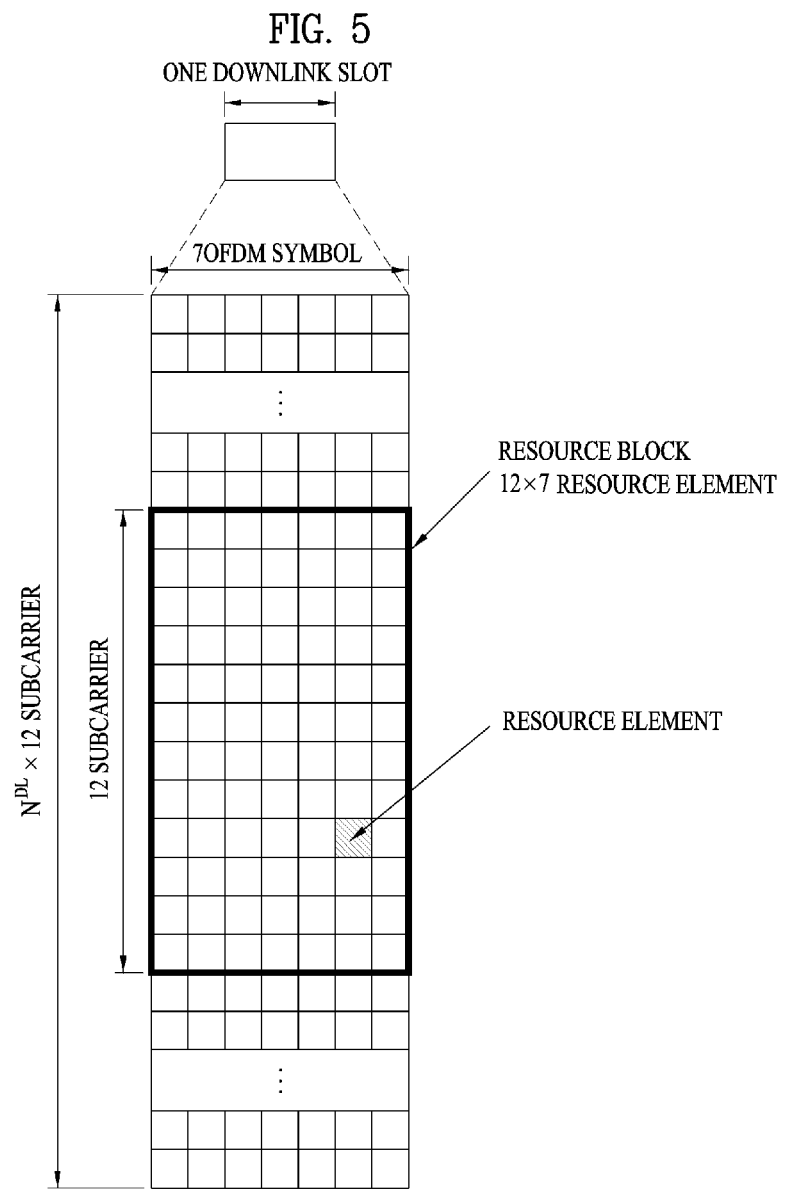
FIG. 5 illustrates a resource grid of a DL slot.

FIG. 5 illustrates a resource grid of a DL slot.

Referring to FIG. 5, a DL slot includes $N_{symb}^{DL}$ OFDM symbols in the time domain and $N_{RB}^{DL}$ RBs in the frequency domain. Each RB includes $N_{sc}^{RB}$ subcarriers and thus the DL slot includes $N_{RB}^{DL} \times B_{sc}^{RB}$ subcarriers in the frequency domain. Although FIG. 5 illustrates the case in which a DL slot includes 7 OFDM symbols and an RB includes 12 subcarriers, the present invention is not limited thereto. For example, the number of OFDM symbols included in the DL slot may differ according to CP length.

Each element on the resource grid is referred to as a resource element (RE). One RE indicated by one OFDM symbol index and one subcarrier index. One RB includes $N_{symb}^{DL} \times N_{sc}^{RB}$ REs. The number of RBs, $N_{RB}^{DL}$, included in a DL slot depends on DL bandwidth configured in a cell.

Figure 6:
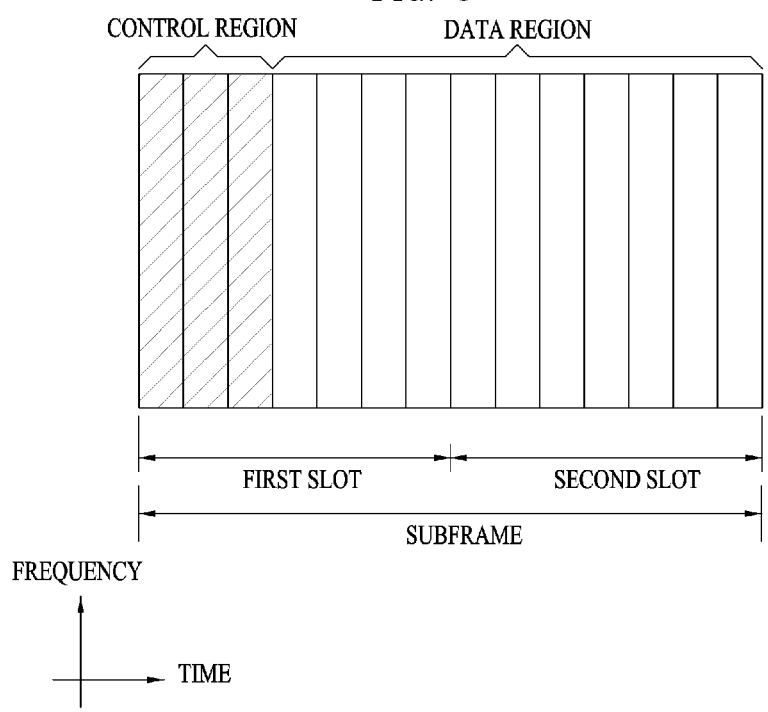
FIG. 6 illustrates the structure of a DL subframe.

FIG. 6 illustrates the structure of a DL subframe.

Referring to FIG. 6, up to three or four OFDM symbols at the start of the first slot of a DL subframe are used as a control region to which control channels are allocated and the other OFDM symbols of the DL subframe are used as a data region to which a PDSCH is allocated. DL control channels defined for the LTE system include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH delivers a HARQ ACK/NACK signal as a response to UL transmission.

Control information carried on the PDCCH is called downlink control information (DCI). The DCI transports resource allocation information and other control information for a UE or a UE group. For example, the DCI includes DL/UL scheduling information, UL transmit (Tx) power control commands, etc.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a

TABLE 1

| | | Normal cyclic prefix in downlink | | | Extended cyclic prefix in downlink | |
|---|---|---|---|---|---|---|
| | | UpPTS | | | UpPTS | |
| | | Normal | Extended | | Normal cyclic | Extended cyclic |
| Special subframe configuration | DwPTS | cyclic prefix in uplink | cyclic prefix in uplink | DwPTS | prefix in uplink | prefix in uplink |
| 0 | 6592 · T$_s$ | 2192 · T$_s$ | 2560 · T$_s$ | 7680 · T$_s$ | 2192 · T$_s$ | 2560 · T$_s$ |
| 1 | 19760 · T$_s$ | | | 20480 · T$_s$ | | |
| 2 | 21952 · T$_s$ | | | 23040 · T$_s$ | | |
| 3 | 24144 · T$_s$ | | | 25600 · T$_s$ | | |
| 4 | 26336 · T$_s$ | | | 7680 · T$_s$ | 4384 · T$_s$ | 5120 · T$_s$ |
| 5 | 6592 · T$_s$ | 4384 · T$_s$ | 5120 · T$_s$ | 20480 · T$_s$ | | |
| 6 | 19760 · T$_s$ | | | 23040 · T$_s$ | | |
| 7 | 21952 · T$_s$ | | | 12800 · T$_s$ | | |
| 8 | 24144 · T$_s$ | | | — | — | — |
| 9 | 13168 · T$_s$ | | | — | — | — |

Meanwhile, the type 2 radio frame structure, that is, UL/DL subframe configurations in a TDD system are listed in Table 2.

TABLE 2

| Uplink-downlink con-figuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. Table 2 further illustrates DL-to-UL switch point periodicities for the respective UL/DL subframe configurations in the system.

The above-described structures of radio frames are purely exemplary.

random access response transmitted on the PDSCH, a set of transmit power control commands for individual UEs of a UE group, transmit power control commands, voice over Internet protocol (VoIP) activation indication information, etc. A plurality of PDCCHs may be transmitted in the control region. A UE may monitor a plurality of PDCCHs. A PDCCH is transmitted on an aggregate of one or more consecutive control channel elements (CCEs). A CCE is a logical allocation unit used to provide a PDCCH at a coding rate based on the state of a radio channel. A CCE includes a plurality of resource element groups (REGs). The format of a PDCCH and the number of available bits for the PDCCH are determined according to the number of CCEs. An eNB determines a PDCCH format according to DCI transmitted to a UE and attaches a cyclic redundancy check (CRC) to control information. The CRC is masked by an identifier (ID) (e.g. a radio network temporary identifier (RNTI)) according to the owner or use of the PDCCH. If the PDCCH is destined for a specific UE, the CRC may be masked by a cell-RNTI (C-RNTI) of the UE. If the PDCCH carries a paging message, the CRC thereof may be masked by a paging ID (P-RNTI). If the PDCCH carries system information (particularly, a system information block (SIB)), the CRC thereof may be masked by a system information RNTI (SI-RNTI). If the PDCCH is designated as a random access response, the CRC thereof may be masked by a random access-RNTI (RA-RNTI).

Hereinafter, a transmission mode of a downlink data channel will be exemplified.

The current 3GPP LTE standard document, in detail, the 3GPP TS 36.213 document defines a downlink data channel transmission mode as shown in Tables 3 and 4 below. In addition, the following transmission mode is configured for a UE via higher layer signaling, i.e. RRC signaling.

TABLE 3

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Large delay CDD or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user MIMO |
| Mode 6 | DCI format 1A | Transmit diversity |
|  | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
|  | DCI format 1 | Single-antenna port, port 5 |
| Mode 8 | DCI format 1A | If the number of PBCH antenna ports is one, Single-antenna port, port 0 is used, otherwise Transmit diversity |
|  | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2D | Up to 8 layer transmission, ports 7-14 or single-antenna port, port 7 or 8 |

TABLE 4

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Transmit diversity |
| Mode 4 | DCI format 1A | Transmit diversity |
|  | DCI format 2 | Transmit diversity |
| Mode 5 | DCI format 1A | Transmit diversity |
| Mode 6 | DCI format 1A | Transmit diversity |
| Mode 7 | DCI format 1A | Single-antenna port, port 5 |
|  | DCI format 1 | Single-antenna port, port 5 |
| Mode 8 | DCI format 1A | Single-antenna port, port 7 |
|  | DCI format 2B | Single-antenna port, port 7 or 8 |
| Mode 9 | DCI format 1A | Single-antenna port, port 7 |
|  | DCI format 2C | Single-antenna port, port 7 or 8, |
| Mode 10 | DCI format 1A | Single-antenna port, port 7 |
|  | DCI format 2D | Single-antenna port, port 7 or 8, |

As shown in Tables 3 and 4 above, the current 3GPP LTE standard document defines downlink control information (DCI) format according to a type of RNTI masked on a PDCCH, and in particular, in the case of C-RNTI and SPS C-RNTI, Tables 3 and 4 show a transmission mode and DCI format corresponding thereto, that is, transmission mode-based DCI format. In addition, DCI format 1A for a fall-back mode, which can be applied irrespective of each transmission mode, is defined. Table 3 above shows an example of a case in which a type of RNTI masked on a PDCCH is C-RNTI, and Table 4 above shows an example of a case in which a type of RNTI masked on a PDCCH is SPS C-RNTI.

As an example of an operation of a transmission mode, when a UE detects DCI format 1B as a result obtained by blind-decoding a PDCCH masked with C-RNTI, a PDSCH is decoded under the assumption that a PDSCH is transmitted via a closed-loop spatial multiplexing scheme using a single layer.

In Tables 3 and 4 above, transmission mode 10 refers to a downlink data channel transmission mode of the aforementioned CoMP transmission scheme. Referring to Table 3 above, when a UE detects DCI format 2D as a result obtained by blind-decoding a PDCCH masked with C-RNTI, a PDSCH is decoded under the assumption that a PDSCH is transmitted using a multiple layer transmission scheme based on antenna ports 7 through 14, that is, DM-RS. Alternatively, a PDSCH is decoded under the assumption that a PDSCH is transmitted via a single antenna transmission scheme based on DM-RS antenna port 7 or 8.

On the other hand, when DCI format 1A is detected as a result by blind-decoding a PDCCH masked with C-RNTI, a transmission mode is changed according to whether a corresponding subframe is a MBSFN subframe. For example, when the corresponding subframe is a non-MBSFN subframe, a PDSCH is decoded under the assumption that the PDSCH is transmitted via a CRS-based transmission diversity scheme or single antenna transmission based on CRS of antenna port 0. In addition, when the corresponding subframe is a MBSFN subframe, a PDSCH may be decoded under the assumption that the PDSCH is transmitted via a single antenna transmission scheme based on DM-RS of antenna port 7.

The recent 3GPP LTE-A standard defines a PDSCH RE mapping and quasi-co-location indicator (PQI) field in DCI format 10 for transmission mode 10 that is transmission of PDSCH of a CoMP method. In detail, the PQI field is defined with a 2-bit size and indicates four of total states, information indicated by each state is a parameter set for reception of a PDSCH of a CoMP method, and detailed values of the information are pre-signaled via a higher layer.

The recent 3GPP LTE-A standard defines a PDSCH RE mapping and quasi-co-location indicator (PQI) field in DCI format 10 for transmission mode 10 that is transmission of PDSCH of a CoMP method. In detail, the PQI field is defined with a 2-bit size and indicates four of total states, information indicated by each state is a parameter set for reception of a PDSCH of a CoMP method, and detailed values of the information are pre-signaled via a higher layer.

Information contained in the parameter set includes one or more of the number of CRS antenna ports (crs-PortsCount), a frequency shift value of CRS (crs-FreqShift), MBSFN subframe configuration (mbsfn-SubframeConfigList), ZP CSI-RS configuration (csi-RS-ConfigZPId), a PDSCH start symbol (pdsch-Start), quasi co-location (QCL) information of non-ZP (NZP) CSI-RS, and qcl-CSI-RS-ConfigNZPId information.

Hereinafter, quasi co-location (QCL) will be described.

QCL between antenna ports refers to the assumption that large-scale properties of a signal (or a wireless channel corresponding to a corresponding antenna port) received from one antenna port by a UE are entirely or partially the same as large-scale properties of a signal (or a wireless channel corresponding to a corresponding antenna port) received from the other one antenna port. Here, the large-scale properties may include Doppler shift and Doppler spread associated with frequency offset, and delay spread and average delay associated with timing offset, etc. and may also include average gain.

According to the above definition, a UE cannot assume that large-scale properties are the same between antenna ports that are not QCL, that is, non quasi co-located (NQCL) antenna ports. In this case, the UE needs to independently perform a tracking procedure for acquisition of frequency offset, timing offset, etc. for each antenna port.

On the other hand, it is advantageous that a UE can perform the following operations between QCL antenna ports.

1) The UE can apply estimation results of power-delay profile, delay spread, Doppler spectrum, and Doppler spread for a wireless channel corresponding to a specific antenna port to a Wiener filter parameter, etc. used for channel estimation for a wireless channel corresponding to the other antenna port in the same way.

2) In addition, the UE may acquire time synchronization and frequency synchronization for the specific antenna port and then also apply the same synchronization to other antenna ports.

3) Lastly, the UE may calculate an average value of measured values of reference signal received power (RSRP) for each of QCL antenna ports for average gain.

For example, upon receiving DM-RS-based downlink data channel scheduling, for example, DCI format 2C through a PDCCH (or an EPDCCH), it is assumed that the UE performs channel estimation on a PDSCH through a DM-RS sequence indicated by the scheduling information and then performs data demodulation.

In this case, when a DM-RS antenna port for downlink data channel demodulation is QCL with a CRS antenna port of a serving cell, the UE may apply large-scale properties of a radio channel that is estimated from the CRS antenna port of the UE during channel estimation via the corresponding DM-RS antenna port so as to enhance DM-RS-based downlink data channel reception performance.

Similarly, when a DM-RS antenna port for downlink data channel demodulation is QCL with a CSI-RS antenna port of a serving cell, the UE may apply large-scale properties of a radio channel that is estimated from the CSI-RS antenna port of the serving cell during channel estimation via the corresponding DM-RS antenna port so as to enhance DM-RS-based downlink data channel reception performance.

The LTE system defines that an eNB configures one of QCL type A and QCL type B for the UE via a higher layer signal when a downlink signal is transmitted in transmission mode 10 as a CoMP mode.

Here, QCL type A means that it is assumed that the remaining large-scale properties of CRS and CSI-RS antenna ports, except for average gain, are QCL and physical channels and signals are transmitted in the same point.

On the other hand, QCL type B means that it is assumed that the remaining large-scale properties of DM-RS and CSI-RS antenna ports, except for average gain. In particular, QCL type B is defined to configure a maximum of four QCL modes for each UE via a higher layer message so as to facilitate transmission of CoMP such as DPS, JT, etc. and to dynamically configure a QCL mode for reception of a downlink signal among the four QCL modes via downlink control information (DCI). The information is defined in qcl-CSI-RS-ConfigNZPId of a parameter set of the PQI field.

Transmission of DPS when QCL type B is configured will be described in more detail.

First, it is assumed that node #1 including N1 antenna ports transmits CSI-RS resource #1 and node #2 including N2 antenna ports transmits CSI-RS resource #2. In this case, CSI-RS resource #1 is included in parameter set #1 of the PQI and CSI-RS resource #2 is included in parameter set #2 of the PQI. Furthermore, an eNB signals parameter set #1 and parameter set #2 via a higher layer to a UE present in common coverage of node #1 and node #2.

Then the eNB may perform DPS by configuring parameter set #1 using DCI while transmitting data (i.e. PUSCH) to the corresponding UE via node #1 and configuring parameter set #2 while transmitting data via node #2. In terms of the UE, through DCI, it is assumed that, when parameter set #1 is configured via the PQI, CSI-RS resource #1 and DM-RS are QCL and that, when parameter set #2 is configured via the PQI, CSI-RS resource #2 and DM-RS are QCL.

Figure 7:
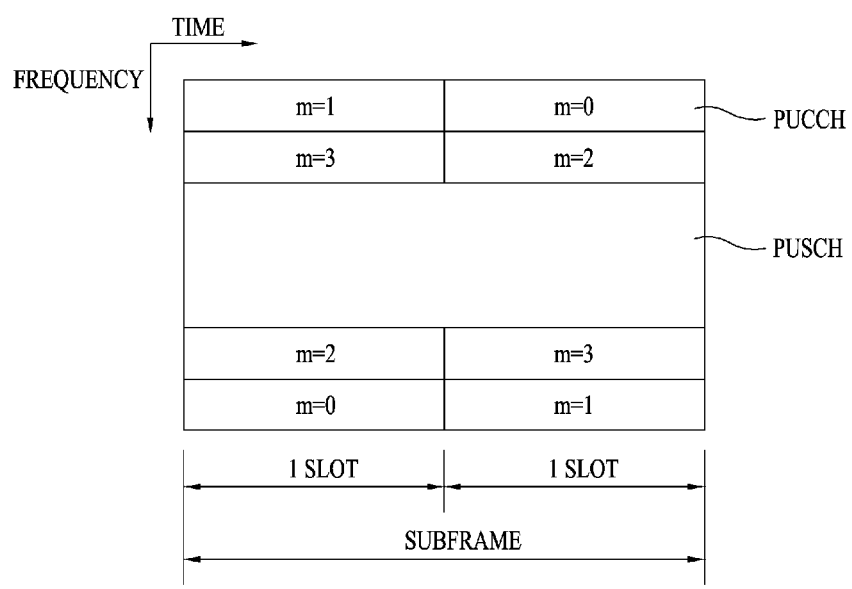
FIG. 7 is a diagram illustrating a structure of an uplink subframe used in LTE.

FIG. 7 is a diagram illustrating a structure of an uplink subframe used in LTE.

Referring to FIG. 7, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel quality indicator (CQI): This is feedback information about a downlink channel. Feedback information regarding multiple input multiple output (MIMO) includes Rank Indicator (RI) and Precoding Matrix Indicator (PMI). 20 bits are used for each subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH.

Hereinafter, cooperative multipoint transmission/reception (CoMP) will be described.

A system after LTE-A has attempted to introduce a scheme for raising system performance by enabling cooperation among a plurality of cells. Such a scheme is called cooperative multipoint transmission/reception (CoMP). CoMP refers to a scheme for two or more eNBs, access points, or cells to cooperatively communicate with a specific UE for smooth communication between the UE and the eNBs, access points, or cells. In the present invention, eNB, access point, and cell may have the same meaning.

In general, in a multi-cell environment in which a frequency reuse factor is 1, the performance of the UE located on the cell edge and average sector throughput may be reduced due to inter-cell interference (ICI). In order to reduce the ICI, in the existing LTE system, a method of enabling the UE located on the cell edge to have appropriate throughput and performance using a simple manual method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

Figure 8:
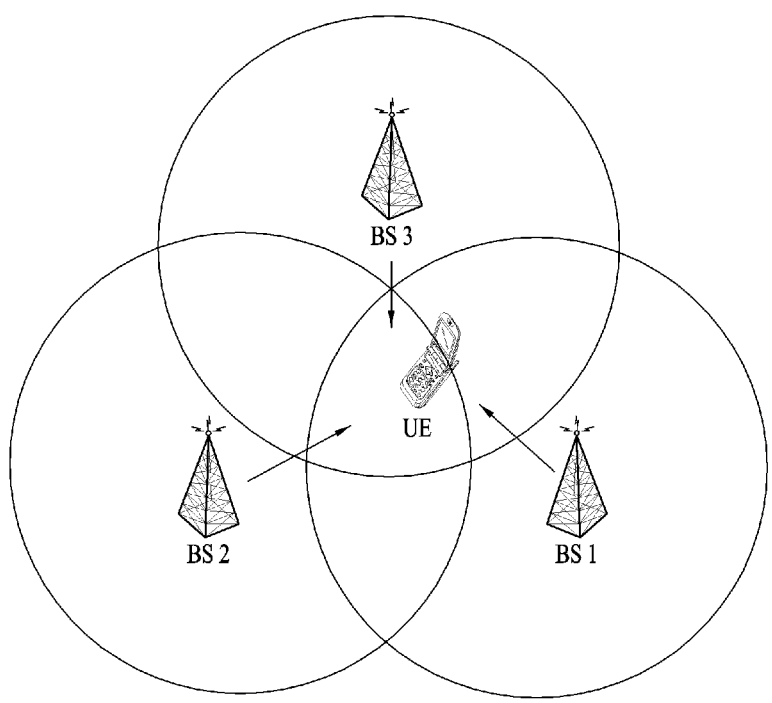
FIG. 8 is a diagram illustrating an example of performing CoMP.

FIG. 8 is a diagram illustrating an example of performing CoMP. Referring to FIG. 8, a wireless communication system includes a plurality of eNBs BS1, BS2, and BS3 that perform CoMP and a UE. The eNBs BS1, BS2, and BS3 for performing CoMP may efficiently transmit data to the UE through cooperation. CoMP may be broadly divided into two schemes:

Joint processing (CoMP joint processing: CoMP-JP)

CoMP-coordinated scheduling/beamforming (CoMP-CS)

In the case of CoMP-JP, data is simultaneously transmitted from eNBs performing CoMP to one UE and the UE combines signals received from the eNBs to improve reception performance. That is, CoMP-JP may use data in each point (eNB) of a CoMP cooperation unit. The CoMP cooperation unit refers to a set of eNBs used in cooperation transmission schemes. The JP scheme is further divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

On the other hand, in the case of CoMP-CS, data is transmitted to one UE through one eNB at an arbitrary time and scheduling or beamforming is performed such that interference caused by other eNBs may be minimized. That is, according to the CoMP-CS/CB scheme, CoMP cooperation units may cooperatively perform beamforming of data transmission on a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

Hereinafter, interference between a plurality of cells will be described.

Like in the case in which two eNBs (e.g. eNB#1 and eNB#2) are adjacently arranged, when coverages of the two eNBs partially overlap each other, a strong downlink signal from one eNB may cause interference with a UE served by another eNB. As such, when inter-cell interference occurs, the inter-cell interference may be reduced via an inter-cell cooperation signal method between two eNBs. With regard to various embodiments of the present invention that will be described below, it is assumed that a signal is smoothly transmitted and received between two eNBs that transmit and receive interference. For example, it is assumed that wired/wireless link (e.g. backhaul link or Un interface) with an excellent transmission condition such as a transmission bandwidth, time delay, etc. between the eNBs is present and high reliability for transmission and reception of a cooperation signal between eNBs is achieved. In addition, it may be assumed that time synchronization between two eNBs is matched in an allowable error range (e.g. boundaries of downlink subframes of the two eNBs that transmit and receive interference are aligned) or offset between boundaries of subframes of the two eNBs is obviously recognized.

Referring back to FIG. 8, eNB#1 BS1 may be a macro eNB that servers a broad area with high transmission power and eNB#2 BS2 may be a micro eNB (e.g. pico eNB) that serves a narrow area with low transmission power. As illustrated in FIG. 8, when a UE that is positioned at a cell boundary area of eNB #2 and served by eNB#2 receives strong interference from eNB#1, it may be difficult to effectively perform communication without appropriate cooperation between cells.

In particular, when a plurality of UEs are connected to eNB#2 as a micro eNB with low power and eNB#1 as a macro eNB distributes load providing service, it is likely to cause the above inter-cell interference. For example, when a UE intends to select a serving eNB, a predetermined bias value may be added to reception power from the micro eNB and a bias value may not be added to reception power from the macro eNB so as to calculate and compare reception power of a downlink signal from each eNB, and thus the UE may select an eNB that provides highest downlink reception power as a serving eNB.

Accordingly, much more UEs can be connected to the micro eNB. Although a signal from the macro eNB is much stronger than the micro eNB with regard to intensity of a downlink signal that is actually received by the UE, the micro eNB may be selected as a serving eNB, and a UE connected to the micro eNB may experience strong interference from the macro eNB. In this case, when separate inter-cell cooperation is not provided, it may be difficult for UEs positioned at a boundary of the micro eNB to perform an appropriate operation due to strong interference from the macro eNB.

When interference between cells is present, appropriate cooperation between two eNBs that transmit and receive interference is required and a signal for enabling the cooperation operation may be transmitted and received via link between the two eNBs in order to perform an effective operation. In this case, when inter-cell interference occurs between the macro eNB and the micro eNB, the macro eNB may control the inter-cell cooperation operation and the micro eNB may perform an appropriate operation according to a cooperation signal signaled from the macro eNB.

It is obvious that the above inter-cell interference is merely exemplary and that embodiments of the present invention can also be applied to the case in which inter-cell interference occurs in different situations from the above (e.g. when inter-cell interference occurs between a HeNB of a CSG method and a macro eNB of an OSG method, when a micro eNB causes interference and a macro eNB receives interference, or when inter-cell interference is present between micro eNBs or macro eNBs).

Based on the above description, the present invention proposes a method for efficiently configuring quasi co-location property when use of a radio resource is dynamically changed according to a load state of a system. Hereinafter, an environment using an enhanced PDCCH (EPDCCH) as a control channel transmitted in a legacy PDSCH region is assumed. In addition, when an OFDM symbol used for transmission of a PDCCH is not present (e.g. New Carrier Type; NCT), it is possible to determine and use all OFDM symbols of the corresponding subframe SF as a PDSCH region. Hereinafter, for convenience of description, the proposed method will be described in terms of a 3GPP LTE system. However, a range of a system to which the proposed method is applied can be extensively applied to another system in addition to a 3GPP LTE system. In addition, proposed methods of the present invention can also be extensively applied to the case in which legacy PDCCH-based downlink/uplink communication is performed.

For example, the concept of quasi co-location property may be summarized from the above description and defined for an antenna port as follows.

When two antenna ports are "quasi co-located", a UE may inter large-scale properties of a signal received from one antenna port based on large-scale properties of a signal received from another antenna port.

Here, large-scale properties may include all or some of delay spread, Doppler spread, frequency shift, average received power, or receive timing.

As another example, the concept of the quasi co-location property may be summarized from the above description and defined for a channel as follows.

If two antenna ports are "quasi co-located", a UE may infer large-scale properties of a signal received from a radio channel corresponding to one antenna port based on large-scale properties of a signal received from a radio channel corresponding to another antenna port.

Here, large-scale properties may include all or some of delay spread, Doppler spread, frequency shift, average received power, or receive timing.

However, in the present invention, definitions associated with the aforementioned quasi co-location property are not divided. That is, one of the aforementioned definitions may be applied to the concept of the quasi co-location property. Alternatively, as a similar form, the definition of the quasi co-location property may be changed to the form "it can be assumed that data is transmitted at a co-location between antenna ports under assumption of quasi co-location property" (e.g. "A UE can assume antenna ports at the same transmission point (e.g. TP)") and the present invention can be applied based on such similar modified concepts.

In particular, with regard to the aforementioned quasi co-location property, when a DM-RS transmitted with low density compared with a legacy CRS is used to decode a specific channel (e.g. EPDCCH and PDSCH), estimation accuracy of the large-scale property of the corresponding DM-RS (e.g. frequency/Doppler offset, frequency/Doppler shift, delay spread, received timing, received power, and Doppler spread) can be enhanced through another reference signal (e.g. CRS, CSI-RS, and SRS) with quasi co-location property.

Figure 9:
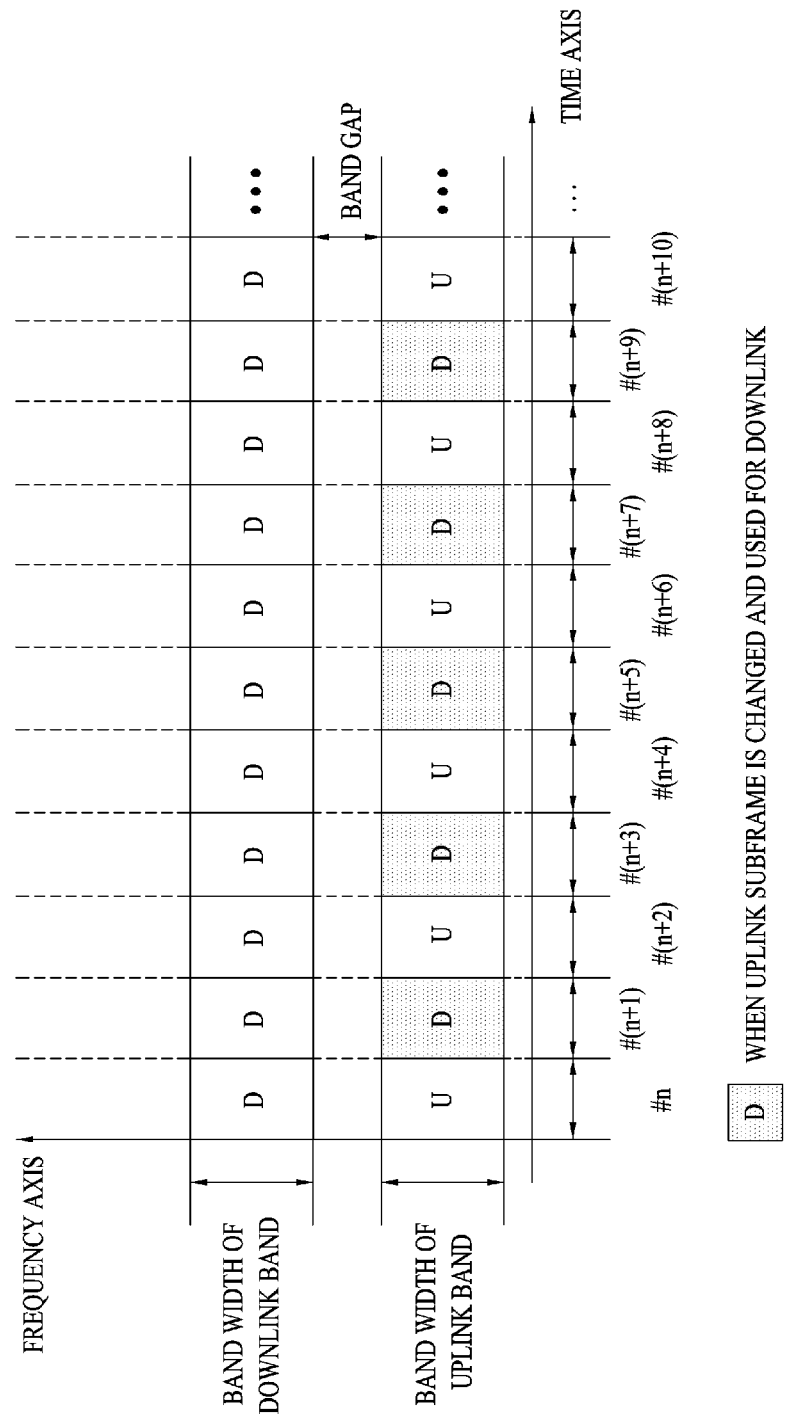
FIG. 9 is a diagram illustrating an example in which a radio resource of a system is dynamically changed in an FDD system environment.

FIG. 9 is a diagram illustrating the case in which an eNB changes and use some uplink subframe (hereinafter, UL SF) of a legacy UL band for downlink communication as a downlink load amount of a system increases in an FDD system environment. FIG. 9 illustrates that uses of uplink subframes UL SF #(n+1), UL SF #(n+3), UL SF #(n+5), UL SF #(n+7), and UL SF #(n+9) are changed to downlink communication.

The present invention proposes a method for efficiently configuring quasi co-location property information about a radio resource, use of which is changed, when use of the radio resource is dynamically changed according to a load state of a system.

In the present invention, configuration of quasi co-location property of a radio resource, use of which is changed, may be independently defined from configuration of quasi co-location property of a radio resource of legacy use or some of quasi co-location properties of a radio resource of legacy use may be configured to be reused based on a pre-defined rule. Information of quasi co-location property of different types of radio resources (e.g. a legacy downlink radio resource, and a downlink radio resource, use of which is changed) may be signaled to a UE by an eNB via a pre-defined signal (e.g. a higher layer/physical layer signal) or may be defined to be implicitly considered according to a pre-defined rule.

Embodiments of the present invention can also be extensively applied to any case in which use of a radio resource is dynamically changed according to a load state or use of a radio resource of some cells that participate in cooperation communication (CoMP) is dynamically changed in an environment an FDD/TDD system, and a FDD band and a TDD band are used in carrier aggregation (CA) or an environment in which a plurality of cells or a plurality of component carriers (CCs) are used in a CA scheme. In addition, the embodiments of the present invention can also be extensively applied to the case in which a legacy downlink radio resource is changed and used for uplink as well as the case in which a legacy uplink radio resource is changed and used for downlink.

The embodiments of the present invention can also be extensively applied to configuration of quasi co-location property between specific reference signals (e.g. CRS, CSI-RS, and SRS) and DM-RS used to decode at least one of a control channel (e.g. EPDCCH), a data transmission channel (e.g. PDSCH), and a system information transmission channel (e.g. EPBCH/ESIB).

In addition, the embodiments of the present invention can also be extensively applied to an operation environment in which an eNB pre-configures "quasi co-location property information of specific large-scale property and/or information of reference signals associated with corresponding quasi co-location property information" associated with a state of each PDSCH RE mapping and quasi-co-location indicator (PQI) to a UE via a higher layer signal and then informs the UE of whether quasi co-location property information associated with a specific PQI state is used (or applied) via a PQI field (e.g. 2 bits) of a pre-defined DCI format (e.g. DCI format 2D).

Furthermore, in the present invention, the term "power configuration value" or "transmission power" is defined to refer to a transmission power value of a reference signal (e.g. CRS, CSI-RS, and DM-RS) and/or a transmission power value of data.

In addition, when a legacy uplink radio resource is changed and used for downlink communication, it is difficult to also apply (or assume) quasi co-location property configured via legacy downlink radio resource-based communication to an uplink resource (i.e. a resource that has been used for downlink communication), use of which is changed. Accordingly, according to embodiments of the present invention, when quasi co-location properties of large-scale properties configured for legacy use of a radio resource and a radio resource, use of which is changed, are different, corresponding related information may be signaled to a UE by an eNB via a pre-defined signal (e.g. a higher layer/physical layer signal) or may be considered to be implicitly considered according to a pre-defined rule.

According to an embodiment of the present invention, as illustrated in FIG. 9, when some uplink subframes (UL SFs) of legacy uplink band are changed and used for downlink communication in an FDD system, a transmission/reception operation is performed through a different frequency band from legacy downlink band (i.e. DL Band) based downlink communication, and thus some large-scale properties (e.g. Doppler spread and frequency/Doppler shift) of even resources that are used for downlink communication in the same way may not be the same.

In this case, when quasi co-location property is configured to be used as default to decode a control/data channel (e.g. EPDCCH and PDSCH) in an FDD system, transmission of an additional reference signal (e.g. CSI-RS or newly defined CSI-RS or CRS) for extraction of quasi co-location property on an uplink resource (i.e. legacy UL band), use of which is changed may be configured.

In detail, an eNB may inform a UE of information about some uplink subframes (UL SFs) of an uplink band to be used for downlink communication via a pre-defined signal according to static property or semi-static property and configure the additional reference signal (e.g. CSI-RS and CRS) transmitted to extract the aforementioned quasi co-location property to be transmitted through uplink subframes (UL SFs), use of which is changed. Here, the quasi co-location property of the uplink resource, use of which is changed, may be configured via large-scale property relation (or comparison) between an additionally transmitted reference signal and a DM-RS used to decode a specific control/data channel transmitted though an uplink resource, use of which is changed.

Needless to say, according to the aforementioned embodiment of the present invention, the additionally transmitted reference signal (e.g. CSI-RS and CRS) for extraction of quasi co-location property on an uplink resource, use of which is changed, may be defined for a TDD system instead of an FDD system. In this case, quasi co-location property of an uplink resource, use of which is changed, of a TDD system may be configured via large-scale property relation (or comparison) between the additionally transmitted reference signal and the DM-RS used to decode a specific control/data channel transmitted though an uplink resource, use of which is changed.

According to another embodiment of the present invention, when a legacy uplink radio resource is changed and used for downlink communication, an eNB may perform the corresponding downlink communication with relatively low power configuration (e.g. including at least one of data transmission power and reference signal power) in order to reduce interference to uplink communication between a UE and an adjacent eNB that uses the same frequency band as legacy use (e.g. uplink use).

For example, when some uplink subframes (UL SFs) of a legacy uplink radio resource are changed and use for downlink communication in a TDD system, an eNB may configure transmission power on an uplink resource, use of which is changed, to a relatively low value compared with transmission power on a legacy downlink resource in order to alleviate interference. Thus, reception power of a reference signal received via the uplink resource, use of which is changed, by the UE may be lower than a legacy downlink resource-based communication. However, since the two types of downlink communications are performed based on the same frequency band, some large-scale property (e.g. Doppler spread, delay spread, and reception timing) may have the same property. Here, the two types of downlink communications may be defined as legacy downlink resource-based communication and communication based on an uplink resource, use of which is changed.

Accordingly, in this case, only some large-scale properties that can be assumed to be the same between different types of downlink communications among large-scale properties of a reference signal transmitted on a legacy downlink resource may be configured to be used in a decoding operation of control/data information transmitted in an uplink resource, use of which is changed, without configuration of an additional reference signal (e.g. CSI-RS and CRS) for extraction of quasi co-location property on the aforementioned uplink resource, use of which is changed.

Furthermore, information (i.e. quasi co-location property configuration information) of some large-scale properties of a specific reference signal to be considered to be the same between different types of downlink communications may be informed to a UE by an eNB via a pre-defined signal. For example, when some large-scale properties of a reference signal (e.g. CRS and CSI-RS) transmitted on a legacy downlink resource can also be assumed in the same way for a DM-RS used to decode a specific control/data channel transmitted via an uplink resource, use of which is changed, quasi co-location property of some large-scale property to be assumed to be the same between the reference signals can be configured.

According to another embodiment of the present invention, it is assumed that an eNB informs a UE of offset (or a power offset value) between a downlink power configuration value on a legacy downlink resource and a downlink power configuration value on an uplink resource, use of which is changed, via a pre-defined signal.

In this case, the UE may be configured to calculate (or extract) pre-configured large-scale property of average gain or average received power on an uplink resource, use of which is changed, from pre-configured large-scale property using the corresponding offset (or power offset value). Here, the large-scale property of average gain or average received power on an uplink resource, use of which is changed, may be calculated (or extracted) by subtracting the signaled power offset value from the corresponding large-scale property (i.e. average received power or average gain) on a legacy downlink resource. In addition, this operation may be configured to apply large-scale property of average received power between different types of downlink communications as quasi co-location property by adding the signaled power offset to large-scale property of average received power on an uplink resource, use of which is changed. Similarly, the operation will now be described in terms of large-scale property of average gain on an uplink resource, use of which is changed. It is possible to configure quasi co-location property of corresponding large-scale property between different types of downlink communications in terms of large-scale property of average gain by adding the signaled power offset to the large-scale property of average gain on an uplink resource, use of which is changed.

According to another embodiment of the present invention, when a downlink power configuration value on an uplink resource, use of which is changed, is highly different from a downlink power configuration value on a legacy downlink resource, an eNB may frequently use radio frequency (RF) terminals or two types of amplifiers (having different linear amplification period properties) for different radio resource type-based downlink communication.

In this case, when the corresponding amplifiers are operated by sharing the same oscillator, some large-scale properties (e.g. frequency shift, Doppler shift, frequency offset, etc.) may be assumed to be the same between two types of downlink communications. On the other hands, when the corresponding amplifiers are operated by different oscillators, respectively, some large-scale properties (e.g. frequency shift, Doppler shift, frequency offset, etc.) between the two types of downlink communications may not be ensured.

Accordingly, when the two types of amplifiers (or RF terminals) are operated by sharing the same oscillator under a TDD system, some large-scale properties (e.g. frequency shift, Doppler shift, frequency offset, etc.) of a reference signal (e.g. CRS and CSI-RS) transmitted on a legacy downlink resource can also be assumed to be the same for a DM-RS used to decode a specific control/data channel transmitted through an uplink resource, use of which is changed, and quasi co-location property of some large-scale property to be assumed to be the same between the reference signals may be configured. Furthermore, an eNB may inform a UE of information associated with configuration of the aforementioned form of quasi co-location property via a pre-defined signal and may additionally inform the UE of information of some large-scale properties to be assumed to be the same on an uplink resource, use of which is changed, among large-scale properties of reference signals (e.g. DM-RS, CRS, and CSI-RS) transmitted on a legacy downlink resource.

According to another embodiment of the present invention, when some uplink subframes (UL SFs) of legacy uplink band is changed and used for downlink communication under an FDD system, an additional RF terminal or amplifier for uplink band-based downlink communication may be used. In this case, some large-scale properties (e.g. Doppler spread, frequency/Doppler shift, frequency offset, average receive power, or average gain) between uplink band-based downlink communication and (legacy) downlink band-based downlink communication may not be the same according to whether different RF terminals or amplifiers are used. In addition, some large-scale properties between uplink band-based downlink communication and (legacy) downlink band-based downlink communication may not be the same according to whether the same oscillator is used. In this case, the aforementioned embodiment of the present invention may be applied in the same way for configuration of quasi co-location property for an uplink resource, use of which is changed.

According to another embodiment of the present invention, when a legacy uplink radio resource is changed and used for downlink communication, specific reference signals (e.g. CRS) transmitted through a legacy downlink radio resource may be configured not to be transmitted on an uplink resource, use of which is changed, due to interference issue.

Accordingly, configuration of a specific reference signal that is not transmitted on an uplink resource, use of which is changed, may be applied via a method for reducing interference that affects communication between a UE an eNB that use the same frequency band as legacy use (e.g. use of uplink communication). That is, according to the aforementioned embodiments of the present invention, it may be seen from, when a legacy uplink radio resource is changed and used for downlink communication, quasi co-location property between some reference signals transmitted on a legacy downlink resource is not satisfied (or effective) on an uplink resource, use of which is changed. Furthermore, an eNB may inform a UE of information associated with non-transmission of a specific reference signal (e.g. ineffective quasi co-location property information between reference signals by not transmitting a pre-defined specific reference signal on an uplink resource, use of which is changed) via a pre-defined signal.

According to another embodiment of the present invention, when use of a radio resource of a specific cell that participates in cooperation communication under a cooperation communication environment (CoMP) is dynamically changed according to a load state of a system, a specific eNB may inform a UE (e.g. a CoMP UE or a non-CoMP UE) of "information about related reference signals for configuration of quasi co-location property based on specific large-scale property" for a resource, use of which is changed independently from "information about related reference signals (e.g. DM-RS and CSI-RS) for configuration of quasi co-location property based on specific large-scale property" for a radio resource of legacy use via a pre-defined signal (e.g. a physical layer/higher layer signal).

Here, when a radio resource set of legacy use and a radio resource set of changed use are defined as 'set#X' and 'set#Y', respectively, an eNB may inform a UE of each piece of "information about related reference signals for configuration of quasi co-location property based on specific large-scale property" for different sets via a pre-defined signal (e.g., a higher layer signal). For example, "a type of related reference signals (e.g. DM-RS and CSI-RS) for configuration of quasi co-location property based on specific large-scale property" and "a type of corresponding large-scale property" defined for each respective set may be configured such that at least one of the types are different for the respective sets or at least some of the types are the same or the remaining of the types are different, as shown in Table 5 below.

When an eNB informs a UE of whether specific quasi co-location property is used to decode a control/data channel of a transmission time point of pre-defined DCI using a pre-defined DCI field (e.g. a PQI field), the UE may be configured to assume different quasi co-location properties according to a type of a set associated with a subframe position (or a subframe time point) in which DCI with corresponding purpose is received. For example, when one is selected among a plurality of pieces of information about related reference signals for configuration of quasi co-location property based on a plurality of specific large-scale properties that is pre-defined through a DCI field (e.g. a PQI field) or when an eNB pre-configures information about reference signals related to the corresponding quasi co-location property information and quasi co-location property information about specific large-scale property associated with each PQI state via a high layer signal and then informs the UE of whether information of quasi co-location property associated with a specific PQI state is applied (or used) through a PQI field (e.g. 2 bits) of a pre-defined DCI format (e.g. DCI format 2D), the UE may be configured to assume different quasi co-location properties according to a type of a set associated with a subframe position (or a subframe time point) in which DCI with corresponding purpose is received.

For example, even if pre-defined DCI fields used to indicate whether specific large-scale property information is applied (or used) is configured to the same, the UE may be configured to consider the value as at least one of "information about related reference signals for configuration of quasi co-location property based on specific large-scale property and a type of the corresponding large-scale property" of a corresponding set according to a type of a set associated with a subframe position (or a subframe time point) in which pre-defined DCI is received.

That is, referring to Table 5 below, Table 5 shows an example of "at least one of information about related reference signals for configuration of quasi co-location property based on specific large-scale property and a type of the corresponding large-scale property" that is each defined for set#X and set#Y. Here, Table 5 shows that, even if values of DCI received by a UE are the same, different quasi co-location properties are configured for respective sets, and even if values of DCI received by a UE are different, when the same quasi co-location property configuration (or large-scale property) is defined (e.g. in the case of "10" of set#X and "00" of set#Y), the same quasi co-location property (or large-scale property) is configured. Furthermore, in Table 5 below, an eNB may independently inform a UE of a PQI state-related information set about a radio resource of legacy use (e.g. legacy downlink resource or downlink resource of static use) and a PQI state related information set about a resource, use of which is changed (e.g., an uplink resource, use of which is changed) via a pre-defined signal (e.g. a physical layer signal or a higher layer signal).

TABLE 5

| DCI field value (PQI field value) | Type of reference signals related to configuration of quasi co-location property | Type of Larg-scale property |
|---|---|---|
| Set #X ||| 
| 00 | DM-RS, CSI-RS Configuration #A | Large-scale Property #a |
| 01 | DM-RS, CSI-RS Configuration #B | Large-scale Property #b |
| 10 | DM-RS, CSI-RS Configuration #C | Large-scale Property #c |
| 11 | DM-RS, CSI-RS Configuration #D | Large-scale Property #d |
| Set #Y ||| 
| 00 | DM-RS, CSI-RS Configuration #C | Large-scale Property #c |
| 01 | DM-RS, CSI-RS Configuration #D | Large-scale Property #d |
| 10 | DM-RS, CSI-RS Configuration #E | Large-scale Property #e |
| 11 | DM-RS, CSI-RS Configuration #F | Large-scale Property #f |

According to another embodiment of the present invention, when a legacy uplink radio resource is changed and used for downlink communication under a TDD system environment, a legacy downlink resource and an uplink resource, use of which is changed, are embodied in the same frequency band, and thus quasi co-location properties based on specific large-scale properties between CRS and DM-RS (or CRS and CSI-RS) may be assumed to be the same between two types of resources (i.e. a legacy downlink resource and an uplink resource, use of which is changed).

For example, Doppler spread and delay spread between CRS and DM-RS (or CRS and CSI-RS), that is, quasi co-location properties based on large-scale properties related to frequency properties may be assumed to be the same between two types of resources configured in the same frequency band.

In addition, an eNB may inform a UE of information of quasi co-location property between reference signals to be assumed to be the same between two types of resources through a pre-defined signal. That is, quasi co-location property based on specific large-scale property between CRS and DM-RS (or CRS and CSI-RS) configured on an uplink resource, use of which is changed, may also be applied without change.

According to another embodiment of the present invention, in order to reduce interference to another cell using a corresponding resource with legacy use (i.e. uplink communication) on an uplink resource, use of which is changed, of a TDD system, a specific reference signal (e.g. CRS and CSI-RS) may be configured not to be transmitted. Here, a legacy downlink resource and an uplink resource, use of which is changed, are embodied in the same frequency band, and thus, even if CRS (or CSI-RS) is not transmitted on an uplink resource, use of which is changed, large-scale property related to frequency property such as Doppler spread and delay spread to be extracted from CRS (or CSI-RS) transmitted on a legacy downlink resource may also be (re)used for an uplink resource, use of which is changed. In addition, an eNB may inform a UE of information about some large-scale properties to be (re)used for channel estimation based on DM-RS on an uplink resource, use of which is changed, among large-scale properties extracted from CRS (or CSI-RS) transmitted on a legacy downlink resource via a pre-defined signal. Accordingly, it may be considered that quasi co-location properties based on specific large-scale properties between CRS and DM-RS (or CRS and CSI-RS) configured on a legacy downlink resource may also applied without change on an uplink resource, use of which is changed.

According to another embodiment of the present invention, when a specific reference signal (e.g. CRS and CSI-RS) is configured not to be transmitted in order to reduce interference to another cell using a corresponding resource with legacy use (i.e. uplink communication) on an uplink resource, use of which is changed, of a TDD system, some pieces of information related to a specific PQI state defined via a higher layer signal may be configured to be differently assumed according to two types of resources (i.e. a legacy downlink resource and an uplink resource, use of which is changed). For example, when a specific reference signal is configured not to be transmitted, application of CRS/CSI-RS rate matching information, resource element mapping information, large-scale property-based quasi co-location information, PDSCH starting symbol information, etc., which are defined via a higher layer signal, may be configured to be differently operated according to two types of resources.

Accordingly, for example, when a specific reference signal (e.g. CRS and CSI-RS) are configured not to be transmitted on an uplink resource, use of which is changed, unlike a legacy downlink resource, PDSCH resource element mapping information (e.g. related to a specific PQI state) defined for an operation on a legacy downlink resource may be configured to also be applied without change on a corresponding uplink resource, use of which is changed, or another pre-defined type of PDSCH resource element mapping information (e.g. PDSCH resource element mapping information to which only a reference signal, which is actually transmitted on an uplink resource with changed use is reflected) which is pre-defined in consideration of a specific reference signal (e.g. CRS and CSI-RS) that is not transmitted on an uplink resource, use of which is changed, may be configured to be applied.

According to another embodiment of the present invention, it is assumed that a PDSCH starting symbol on a legacy downlink resource is configured based on a PCFICH (or the same value as a value of a PCFICH of a serving cell) of a serving cell and that specific PQI state related information is defined based on this operation via a higher layer signal. In this case, PDSCH starting symbol information (related to a specific PQI state) defined for an operation on a legacy downlink resource may be configured to be applied without change on an uplink resource, use of which is changed, or a PDSCH starting symbol of a different value (e.g. a first OFDM symbol) pre-defined in consideration of a CRS that is not transmitted on an uplink resource with changed use may be configured to be applied (e.g. which reflects the fact that it is difficult to normally transmit a PDCCH in a corresponding resource when a CRS is not transmitted on an uplink resource, use of which is changed). Furthermore, PDSCH starting symbol related information on an uplink resource, use of which is changed, may be configured to be signaled to a UE from an eNB via a pre-defined (additional) signal (e.g. a physical layer or a higher layer signal) or may be considered to be implicitly considered according to a pre-defined rule.

The aforementioned embodiment, in which PDSCH starting symbol information (related to a specific PQI state) defined for the purpose of an operation on a legacy downlink resource is differently assumed on an uplink resource, use of which is changed, may be configured to be applied to only the case in which a specific reference signal (e.g. CRS and CSI-RS) transmitted on a legacy downlink resource is configured not to be transmitted on an uplink resource, use of which is changed or may be configured to be always applied irrespective of whether a specific reference signal is transmitted on an uplink resource, use of which is changed. Alternatively, when PDSCH starting symbol related information on uplink resource information, use of which is changed, is independently defined based on a pre-defined signal or an implicit rule (from PDSCH starting symbol information on a legacy downlink resource), the aforementioned embodiment may be configured to be applied to only the case in which a specific reference signal (e.g. CRS and CSI-RS) transmitted on a legacy downlink resource is configured not to be transmitted on an uplink resource, use of which is changed or may be configured to be always applied irrespective of whether a specific reference signal is transmitted on an uplink resource, use of which is changed.

In addition, the remaining information except for PDSCH resource element mapping information and PDSCH starting symbol information may be configured to be commonly applied between a legacy downlink resource and an uplink resource, use of which is changed.

Furthermore, an eNB may inform a UE of information that is differently assumed or is commonly assumed between a legacy downlink resource and an uplink resource, use of which is changed, among a plurality of pieces of specific PQI state related information via a pre-defined (additional) signal.

In addition, the aforementioned embodiment, in which PDSCH starting symbol information is differently configured between two types of resources (i.e. a legacy downlink resource and an uplink resource, use of which is changed), may be configured to be limited to only the case in which a PDSCH starting symbol on a legacy downlink resource is configured based on a PCFICH (or the same value as a value of a PCFICH of a serving cell) of a serving cell. When a PDSCH starting symbol on a legacy downlink resource is not configured based on a PCFICH (or the same value as a value of a PCFICH of a serving cell) of a serving cell, PDSCH starting symbol information related to a specific PQI state defined for the purpose of an operation on a legacy downlink resource may be assumed to be also applied in the same way on an uplink resource, use of which is changed. Alternatively, a PDSCH starting symbol on a legacy downlink resource may be configured to be always applied irrespective of a PCFICH of a cell, based on which configuration is performed. That is, even if configuration is performed based on a PCFICH of any cell including a serving cell among a plurality of cells that participate in cooperation communication, the PDSCH starting symbol may be configured to be always applied.

Figure 10:
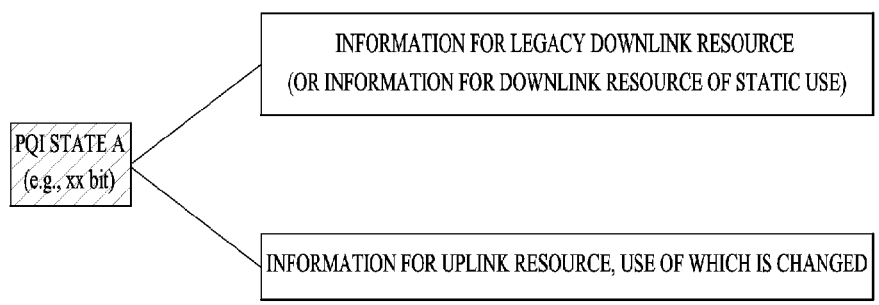
FIG. 10 is a reference diagram for explanation of a method for independently defining information associated with a specific PQI state with respect to two types of resources, according to another embodiment of the present invention.

FIG. 10 is a reference diagram for explanation of a method for independently defining information associated with a specific PQI state with respect to two types of resources, according to another embodiment of the present invention.

Referring to FIG. 10, according to another embodiment of the present invention, an eNB may independently define, for a UE, information (e.g. "CRS/CSI-RS rate matching information, PDSCH resource element mapping information, specific large-scale property-based quasi co-location information, or PDSCH starting symbol information") associated with a specific PQI state via a pre-defined signal (e.g. a higher layer or a physical layer signal) with respect to two types of resources. That is, the information may be independently defined with respect to a legacy downlink resource and an uplink resource, use of which is changed or may be independently defined with respect to downlink resource of static use and an uplink resource, use of which is changed. Here, some pre-defined information may be commonly applied between two types of resources and commonly assumed information may be defined as only information associated with a specific PQI state of a specific type resource (e.g. a legacy downlink resource or an uplink resource, use of which is changed). In addition, the information may be configured to be implicitly configured with respect to different types of resources (without additional definition) or may be defined as information associated with a specific PQI state of a separate type of resources.

When information associated with a specific PQI state is independently defined with respect to two types of resources, information to be commonly assumed between the two types of resources or information to be differently assumed between the two types of resources may have the following examples.

For example, information, in particular, PDSCH starting symbol information is differently configured between two types of resources (that is, a legacy downlink resource and an uplink resource, use of which is changed) because a CRS is configured not to be transmitted on an uplink resource, use of which is changed, when a PDSCH starting symbol (on a legacy downlink resource) is configured to follow a PCFICH of a serving cell. That is, this is because it may be difficult to normally transmit a PDCCH on a corresponding resource when a CRS is not transmitted on an uplink resource, use of which is changed. Similarly, information, in particular, PDSCH starting symbol information is differently configured between a downlink resource of static use and an uplink resource, use of which is changed, because a CRS may be configured not to be transmitted on an uplink resource, use of which is changed, when a PDSCH starting symbol on a downlink resource of static use is configured to follow a PCFICH of a serving cell.

As another example, the aforementioned embodiment, in which PDSCH starting symbol information is differently configured between two types of resources (i.e. a legacy downlink resource and an uplink resource, use of which is changed), may be limited to only the case in which a PDSCH starting symbol (on a legacy downlink resource or a downlink resource of static use) is configured based on a PCFICH of a serving cell. When a PDSCH starting symbol (on a legacy downlink resource or a downlink resource of static use) is not configured based on a PCFICH of a serving cell, PDSCH starting symbol information (related to a specific PQI state) defined for the purpose of an operation on a legacy downlink resource (or a downlink resource of static use) may also be configured to be the same on an uplink resource, use of which is changed. Alternatively, PDSCH starting symbol information (related to a specific PQI state) defined for the purpose of an operation on a legacy downlink resource (or a downlink resource of static use) may also be configured to be the same on an uplink resource, use of which is changed, without additional definition for an uplink resource or an uplink resource, use of which is changed. As an additional example, the aforementioned embodiment, in which PDSCH starting symbol information is differently configured between two types of resources (i.e. a legacy downlink resource and an uplink resource, use of which is changed), may be configured to be always applied irrespective of a PCFICH of a cell, based on which the PDSCH starting symbol (on a legacy downlink resource or a downlink resource of static use) is configured. In other words, the aforementioned embodiment, in which PDSCH starting symbol information is differently configured between two types of resources (i.e. a legacy downlink resource and an uplink resource, use of which is changed), may be configured to be always applied even if the PDSCH starting symbol is configured based on a PCFICH of any cell among a plurality of cells that participate in cooperation communication, including a serving cell.

In addition, respective information for a downlink resource and an uplink resource instead of respective information for a legacy downlink resource and an uplink resource, use of which is changed, may be configured (or interpreted). The following examples show the case in which an eNB independently configures, for a UE, information (e.g. "CRS/CSI-RS rate matching information, PDSCH resource element mapping information, specific large-scale property-based quasi co-location information, or PDSCH starting symbol information") associated with a specific PQI state via a pre-defined signal (e.g. a higher layer or a physical layer signal) with respect to two types of resources. That is, the following examples are detailed examples of FIG. 10.

[Example #1] PQI state A (e.g. xx bit)
Example of information that is commonly assumed between two types of resources
Specific large-scale property-based quasi co-location information, e.g. Doppler spread between CRS and DM-RS (or CRS and CSI-RS) and delay spread (i.e. frequency property related large-scale property) based quasi co-location property
Example of information that is differently assumed between two types of resources
CRS/CSI-RS rate matching information or PDSCH resource element mapping information
PDSCH starting symbol information

[Example #2] PQI state A (e.g. xx bit)
Example of information that is commonly assumed between two types of resources
Specific large-scale property-based quasi co-location information, e.g. Doppler spread between CRS and DM-RS (or CRS and CSI-RS) and delay spread (i.e. frequency property related large-scale property) based quasi co-location property
PDSCH starting symbol information
Example of information that is differently assumed between two types of resources
CRS/CSI-RS rate matching information or PDSCH resource element mapping information According to another embodiment of the present invention, an eNB may be configured to independently inform a UE of PQI state related information sets that are respectively applied to different types of resources (i.e. a legacy downlink resource and an uplink resource, use of which is changed) via a pre-defined signal. For example, when a PQI fields is configured of two bits, the eNB may inform the UE of information related to four PQI states for a legacy downlink resource and information related to four PQI states for an uplink resource, use of which is changed via a pre-defined signal. Needless to say, the eNB may independently inform the UE of information sets (e.g. information related to four PQI states applied to a downlink resource of static use and information related to four PQI states for an uplink resource, use of which is changed) related to a PQI state applied to a downlink resource of static use and an uplink resource, use of which is changed.

Alternatively, the UE may be configured to refer to a set of information related to a PQI state configured for a resource of a corresponding type according to a type of a subframe in which a PQI field is received according to a pre-defined rule. Accordingly, even a PQI field having the same value may be differently applied (or interpreted) according to a type of a subframe in which the corresponding PQI field is received.

Alternatively, an additional bit (e.g. 1 bit) or field may be defined on a legacy DCI format (or an additional bit or field is defined on a legacy PQI field) to indicate an indicator corresponding to a type of a resource of the corresponding PQI field. Furthermore, the UE may refer to PQI state related information about a specific type of resource that is substantially indicated by the corresponding PQI field based on the additional bit (or field).

According to another embodiment of the present invention, when a specific reference signal (e.g. CRS and CSI-RS) is configured to also be transmitted in the same way as a legacy downlink resource (or a downlink resource of static use) on an uplink resource, use of which is changed, of a TDD system, specific PQI state related information (e.g. CRS/CSI-RS rate matching information, PDSCH resource element mapping information, specific large-scale property-based quasi co-location information, PDSCH starting symbol information, etc.) defined for the purpose of an operation on a legacy downlink resource (or a downlink resource of static use) may be configured to also be applied on an uplink resource, use of which is changed or only the remaining information except for (pre-defined) some information (e.g. specific large-scale property based quasi co-location information) may be configured to be applied on an uplink resource, use of which is changed. In addition, an eNB may inform a HE of information about whether a plurality of pieces of specific PQI state information are assumed in the same way between a legacy downlink resource and an uplink resource or are partially assumed differently via a pre-defined signal.

In general, configuration of specific large-scale property-based quasi co-location information may be divided and defined into the following two types (i.e. Behavior A or Behavior B). Here, an eNB may inform a UE of whether Behavior A-based quasi co-location information is configured or Behavior B-based quasi co-location is configured via a pre-defined signal (e.g. a higher layer or a physical layer signal).

Behavior A: CRS, CSI-RS, and PDSCH DMRS may be assumed as quasi co-located with respect to Doppler shift, Doppler spread, average delay, and delay spread.

Behavior B: CRS, CSI-RS, and PDSCH DMRS shall not be assumed as quasi co-located with respect to Doppler shift, Doppler spread, average delay, delay spread, and average gain with the following exception.

PDSCH DMRS and a particular CSI-RS resource indicated by physical layer signaling may be assumed as quasi co-located with respect to Delay spread, Doppler spread, Doppler shift, and average delay.

For each CSI-RS resource, the network shall indicate by RRC signaling that CSI-RS ports and CRS ports of a cell may be assumed as quasi co-located with respect to the following properties.

Doppler shift and Doppler spread

RRC signaling includes Cell ID for quasi co-located CRS, Number of CRS ports, and MBSFN configuration According to another embodiment of the present invention, when a legacy uplink radio resource is changed and used for downlink communication under a TDD system environment, an eNB may independently configure, for a UE, a type based which quasi co-location information is configured with respect to a legacy downlink resource and an uplink resource, use of which is changed, via a pre-defined signal (e.g. a higher layer or a physical layer signal). For example, the eNB may independently configure whether configuration of Behavior A-based quasi co-location information or Behavior B-based quasi co-location information is defined with respect to a legacy downlink resource and an uplink resource, use of which is changed, using a pre-defined signal.

According to another embodiment of the present invention, even if a legacy uplink radio resource is changed and used for downlink communication under a TDD system environment, a rule may be defined such that configuration of a specific behavior-based quasi co-location information configured for a legacy downlink resource is assumed in the same way in an uplink subframe, use of which is changed. In addition, this method may be limited to only the case in which a pre-defined specific reference signal (e.g. CRS and CSI-RS) is configured to be transmitted in an uplink frame, use of which is changed.

Figure 11:
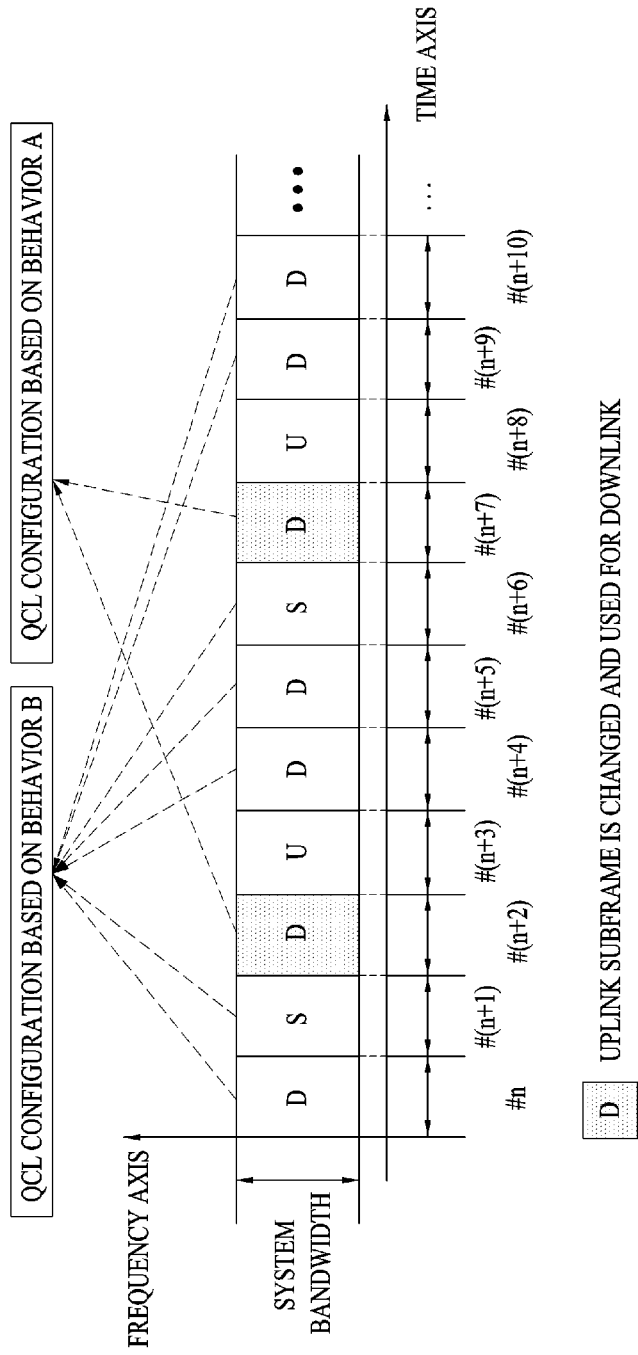
FIG. 11 is a diagram illustrating an example in which different types of quasi co-locations are configured for respective a legacy downlink resource and an uplink resource, use of which is changed.

Accordingly, as illustrated in FIG. 11, different types of quasi co-location information may be configured for a legacy downlink resource and an uplink resource, use of which is changed, respectively. Referring to FIG. 11, it is assumed that an eNB informs a UE of information indicating that a legacy downlink resource and an uplink resource, use of which is changed, are defined as configuration of Behavior B-based quasi co-location information and configuration of Behavior A-based quasi co-location information, via a higher layer signal. In addition, FIG. 11 assumes a TDD system and assumes the case in which some uplink subframes (US SFs) (i.e. UL SF #(n+2) and UL SF #(n+7)) of uplink-downlink configuration #1 (i.e. "DSUUDDSUUD") are changed and used for downlink.

According to another embodiment of the present invention, when at least one piece of information associated with a PQI field transmitted at a specific subframe time point is information about a cell (or a transmission point (TP)) using the corresponding specific subframe for uplink, a UE may be configured to consider at least one corresponding downlink grant (DL Grant) and a PQI field. Here, non-zero power CSI-RS configuration information for each cell (or TP) may be partially or entirely configured to be different for a RRM/RLM/CSI measurement operation for each cell of a UE (or a TP). In consideration of this, uplink-downlink configuration information may be applied to be defined for each piece of non-zero power CSI-RS configuration.

Accordingly, when the corresponding specific subframe is configured for uplink in uplink-downlink configuration information linked to non-zero power CSI-RS configuration indicated on a PQI state associated with a PQI field transmitted at a specific subframe time point, the UE may be configured to consider at least one of the corresponding downlink grant and a PQI field as reception error. In addition, when QCL information associated with a PQI field transmitted at a specific subframe is related to a cell (or a TP) using the corresponding subframe for uplink, the UE may be configured to consider at least one of corresponding downlink grant (DL Grant) and a PQI field as reception error.

According to another embodiment of the present invention, a neighbor cell (or a neighbor TP) that participates in cooperation communication may be configured to be differently applied (or interpreted) for a PQI field (or a plurality of pieces of PQI state related information) according to use of a subframe of a specific time point or a PQI field (or a plurality of pieces of PQI state related information) may be differently applied (or interpreted) according to a type of uplink-downlink (UL-DL) configuration to be applied (in a pre-defined use change period).

For example, when three cells (or TPs) (e.g. cell #A, cell #B, and cell #C) participate in dynamic point selection (DPS) as a type of the cooperation communication (COMP) method, and cell #A and cell #B use a subframe of a specific time point for downlink and cell #C uses the subframe for uplink, a (specific) PQI state for cell #C in which uplink communication is performed does not have to be maintained in at least a corresponding time point. That is, a (specific) PQI state useful when a specific cell (or a TP) performs downlink communication may be configured such that the corresponding (specific) PQI state is reused for another pre-defined use at a subframe time point in which the corresponding specific cell (or a TP) performs uplink communication.

Here, a PQI state associated with a cell (or a TP) that performs an uplink operation at a specific subframe time point may be configured to be reused as a PQI state associated with another cell (or another TP) according to a pre-defined rule. Furthermore, at least one of information about whether the rule is applied, information of (re)configuration of pieces of information linked with the reused PQI state, and a cell (or a TP) associated with the reused PQI state may be configured to be informed to a UE by an eNB via a pre-defined (additional) signal (e.g. a physical layer signal or a higher layer signal).

According to another embodiment of the present invention, when use of a legacy subframe is changed using MBSFN subframe format, the information may be configured to be informed to a UE by an eNB via a pre-defined signal (e.g. a physical layer signal or a higher layer signal) or may be defined to be implicitly considered according to a pre-defined rule (i.e. the case in which a PDCCH is not transmitted can be applied) such that CRS transmission is not performed in a control channel region (e.g. a PDCCH) on the corresponding MBSFN subframe. In addition, when use of (donwink) subframe is changed in a MBSFN subframe, a signal for configuring CRS transmission not to be performed in a control channel region (e.g. a PDCCH) on the corresponding MBSFN subframe may be additionally defined (i.e. the case in which a PDCCH is not transmitted can be applied).

According to embodiments of the present invention, an uplink subframe, use of which is changed, may be defined as a flexible subframe and a legacy downlink subframe may be defined as a static subframe. For example, the flexible subframe may be defined as a subframe used as different use from UL-DL configuration on legacy SIB, a subframe used as different use from use configured in a previous reconfiguration period, or a subframe used as different use from use on a reference HARQ timeline. On the other hand, the static subframe may be defined as a subframe reused as the same use as UL-DL configuration on the legacy SIB, a subframe reused as the same use as use configured in a previous reconfiguration period, or a subframe reused as the same use as use on a reference HARQ timeline.

In particular, a reference downlink/uplink HARQ timeline (i.e. a HARQ timeline configured for maintaining a stable HARQ timeline irrespective of (re)change of UL-DL configuration may be defined as downlink/uplink HARQ timeline of UL-DL configuration including an intersection of uplink subframes and a union of downlink subframes of reconfigurable uplink-downlink configuration candidates or may be defined as a downlink/uplink HARQ timeline including an intersection of downlink subframes of reconfigurable uplink-downlink configuration candidates/union of uplink subframes.

In addition, the aforementioned embodiments of the present invention may be configured to be applied only to the case in which a dynamic change mode of a radio resource use is configuration. In addition, the aforementioned embodiments of the present invention may be configured to be limited to only a specific subframe type.

Figure 12:
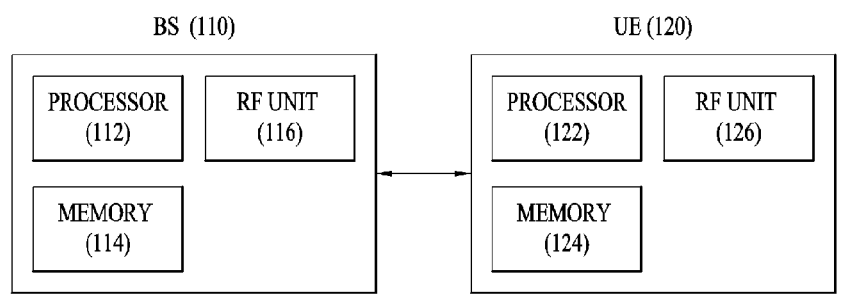
FIG. 12 is a diagram illustrating a base station (BS) and a user equipment (UE) that are applicable to an embodiment of the present invention.

FIG. 12 is a diagram illustrating a BS 110 and a UE 120 that are applicable to an embodiment of the present invention. When a relay is included in a wireless communication system, communication at backhaul link is performed between the BS 110 and the relay, and communication at access link is performed between the relay and the UE 120. Accordingly, the BS 110 or the UE 120 illustrated in FIG. 12 may be replaced with a relay according to situations.

Referring to FIG. 12, the wireless communication system includes the BS 110 and the UE 120. The BS 110 includes a processor 112, a memory 114, and a radio frequency (RF) unit 116. The processor 112 may be configured to embody the procedures and/or methods proposed by the present invention. The memory 114 is connected to the processor 112 and stores various information associated with an operation of the processor 112. The RF unit 116 is connected to the processor 112 and transmits and/or receives a radio signal. The UE 120 includes a processor 122, a memory 124, and an RF unit 126. The processor 122 may be configured to embody the procedures and/or methods proposed by the present invention. The memory 124 is connected to the processor 122 and stores various information associated with an operation of the processor 122. The RF unit 126 is connected to the processor 122 and transmits and/or receives a radio signal. The BS 110 and/or the UE 120 may each have a single antenna or a multiple antenna.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the above-described method and device for transmitting and receiving downlink data in a wireless communication system has been described centering on an example applied to a 3GPP LTE system, the present invention is applicable to a variety of wireless communication systems in addition to the 3GPP LTE system.

The invention claimed is:

1. A method for receiving a downlink signal by a user equipment (UE) in a wireless communication system, the method comprising:
   receiving information associated with a first quasi co-location (QCL) property for a first subframe configured for a downlink communication;
   receiving information associated with a second QCL property indicating a part of the first QCL property available for decoding a downlink signal received through a second subframe reconfigured from an uplink subframe to a downlink subframe for the downlink communication; and
   decoding the downlink signal received through the second subframe using the part of the first QCL property indicated by the information associated with the second QCL property.

2. The method according to claim 1, wherein the first QCL property includes at least one of a delay spread, Doppler spread, Doppler shift, frequency shift, average received power, received timing, average gain and average delay, and
   the second QCL property indicates a part of the first QCL property available for decoding of the second subframe.

3. The method according to claim 1, wherein a reception power for the second subframe is configured to be lower than a reception power for the first subframe.

4. The method according to claim 1, wherein the first subframe and the second subframe are transmitted through different frequency bands, and
   the second QCL property corresponds to at least one QCL parameter commonly assumed between the first subframe and the second subframe transmitted through the different frequency bands, respectively.

5. The method according to claim 1, wherein at least one parameter is commonly assumed between the information associated with the first and second QCL properties when the information associated with the first and second QCL properties is configured to use an oscillator for the first and second subframes.

6. The method according to claim 1, wherein the information associated with the first and second QCL properties is determined according to a radio resource at a time point in which downlink control information (DCI) is received.

7. The method according to claim 6, wherein a format of the DCI is a DCI format 2D.

8. The method according to claim 1, wherein a physical downlink shared channel (PDSCH) starting symbol for the first subframe and a PDSCH starting symbol for the second subframe are independently defined.

9. The method according to claim 1, wherein specific physical downlink shared channel (PDSCH) resource element (RE) mapping and quasi-co-location indicator (PQI) state information is configured to be differently applied to the first and second subframes.

10. A user equipment (UE) for receiving a downlink signal in a wireless communication system, the UE comprising:
    a radio frequency (RF); and
    a processor configured to:
      receive in associated with first quasi co-location (QCL) property for a first subframe configured for a downlink communication,
      receive information associated with a second QCL property indicating a part of the first QCL property available for decoding a downlink signal received through a second subframe reconfigured from an uplink subframe to a downlink subframe for the downlink communication, and
      decode the downlink signal received through the second subframe using the part of the first QCL property indicated by the information associated with the second QCL property.

11. The UE according to claim 10, wherein the first QCL property includes at least one of a delay spread, Doppler spread, Doppler shift, frequency shift, average received power, received timing, average gain and average delay, and
    the second QCL property indicates a part of the first QCL property available for decoding of the second subframe.

12. The UE according to claim 10, wherein a reception power for the second subframe is configured to be lower than a reception power for the first subframe.

13. The UE according to claim 10, wherein the first subframe and the second subframe are transmitted through different frequency bands, and
    the second QCL property corresponds to at least one QCL parameter commonly assumed between the first subframe and the second subframe transmitted through the different frequency bands, respectively.

14. The UE according to claim 10, wherein at least one parameter is commonly assumed between the information associated with the first and second QCL properties when the information associated with the first and second QCL properties is configured to use an oscillator for the first and second subframes.

15. The UE according to claim 10, wherein the information associated with the first and second QCL properties is determined according to a radio resource at a time point in which downlink control information (DCI) is received.

16. The UE according to claim 15, wherein a format of the DCI is a DCI format 2D.

17. The UE according to claim 10, wherein a physical downlink shared channel (PDSCH) starting symbol for the first subframe and a PDSCH starting symbol for the second subframe are independently defined.

18. The UE according to claim 10, wherein specific physical downlink shared channel (PDSCH) resource element (RE) mapping and quasi-co-location indicator (PQI) state information is configured to be differently applied to the first and second subframes.

* * * * *